US009697446B2

(12) United States Patent
Perret et al.

(10) Patent No.: US 9,697,446 B2
(45) Date of Patent: Jul. 4, 2017

(54) ITEM COMPRISING A BARCODE WITH AN ELECTROMAGNETIC SIGNATURE

(71) Applicants: Arjowiggins Security, Boulogne Billancourt (FR); Institut Polytechnique de Grenoble, Grenoble (FR)

(72) Inventors: Etienne Perret, Valence (FR); Arnaud Vena, Guilherand Granges (FR); Smail Tedjini, Beaumont les Valence (FR); Yann Boutant, Chindrieux (FR); Christophe Halope, Cannes (FR)

(73) Assignees: Institut Polytechnique de Grenoble, Grenoble (FR); Arjowiggins Security, Boulogne Billancourt (FR)

( * ) Notice: Subject to any disclaimer, the term of this patent is extended or adjusted under 35 U.S.C. 154(b) by 0 days.

(21) Appl. No.: 14/575,003

(22) Filed: Dec. 18, 2014

(65) Prior Publication Data

US 2015/0102105 A1 Apr. 16, 2015

Related U.S. Application Data

(63) Continuation of application No. PCT/IB2013/055218, filed on Jun. 25, 2013.

(30) Foreign Application Priority Data

Jun. 26, 2012 (FR) .................................... 12 56083

(51) Int. Cl.
*G06K 19/06* (2006.01)
*G06K 19/067* (2006.01)
(Continued)

(52) U.S. Cl.
CPC ..... *G06K 19/06056* (2013.01); *G06K 7/0004* (2013.01); *G06K 19/06046* (2013.01); *G06K 19/0672* (2013.01); *G06K 19/086* (2013.01)

(58) Field of Classification Search
CPC ............... G06K 7/1465; G06K 7/1439; G06K 2007/10524; G06K 2007/10504; G06Q 20/208
See application file for complete search history.

(56) References Cited

U.S. PATENT DOCUMENTS

2004/0245343 A1 12/2004 Depta
2005/0284941 A1 12/2005 Lubow
(Continued)

FOREIGN PATENT DOCUMENTS

EP 1065623 A2 1/2001
EP 1675040 A1 6/2006
(Continued)

OTHER PUBLICATIONS

International Search Report and Written Opinion of PCT/IB2013/055218.
(Continued)

*Primary Examiner* — Kristy A Haupt
(74) *Attorney, Agent, or Firm* — Jones Robb, PLLC (57) ABSTRACT

The present invention relates to a set of security documents. Each security document within the set having an optical code, notably a barcode, which is neither connected nor coupled to any electronic chip that may be carried by the security document. The optical code on each security document within the set encodes the same information for the same optical reader. Each security document having different respective electromagnetic signature, these signatures being unique to each of the security documents.

28 Claims, 2 Drawing Sheets

(51) Int. Cl.
*G06K 19/08* (2006.01)
*G06K 7/00* (2006.01)

(56) References Cited

U.S. PATENT DOCUMENTS

| | | |
|---|---|---|
| 2007/0057054 A1 | 3/2007 | Maranov |
| 2009/0188970 A1* | 7/2009 | Gouelibo ............. G06K 19/086 235/375 |
| 2010/0002303 A1 | 1/2010 | Vast et al. |
| 2010/0078930 A1 | 4/2010 | Rosset |
| 2012/0242072 A1 | 9/2012 | LeLoarer et al. |
| 2013/0015248 A1 | 1/2013 | Perret et al. |

FOREIGN PATENT DOCUMENTS

| | | |
|---|---|---|
| FR | 2899361 A1 | 10/2007 |
| FR | 2951867 A1 | 10/2009 |
| FR | 2956232 A1 | 2/2010 |
| WO | 03019502 A1 | 3/2003 |
| WO | 03/032242 A1 | 4/2003 |
| WO | 2006108913 A1 | 10/2006 |
| WO | 2007/135334 A1 | 11/2007 |
| WO | 2008/053130 A2 | 5/2008 |
| WO | 2012005733 A1 | 1/2012 |

OTHER PUBLICATIONS

English Translation of International Search Report and Written Opinion of PCT/IB2013/055218.

French Preliminary Search Report and Written Opinion of PCT/IB2013/055218.

Violino, "1-Cent RFID Tags for Supermarkets," RFID Journal, Mar. 31, 2003.

Aronoff et al., "Evaluation of Conductive Inks for Anti-Counterfeiting Deterrents," Society for Imaging Science and Technology, NIP24 and Digital Fabrication 2008, pp. 769-772.

Perret et al., "RF and THz Identification Using a New Generation of Chipless RFID Tags," Radioengineering, vol. 20, No. 2, Jun. 2011, pp. 380-386.

Simske et al., "Printed Antennas for Combined RFID and 2D Barcodes," HP Laboratories, 2011.

Collins, "RFID Fibers for Secure Applications," RFID Journal, May 26, 2004.

Wiesbeck et al., "Single Reference, Three Target Calibration and Error Correction for Monostatic, Polarimetric Free Space Measurements," Proceedings of the IEEE, vol. 79, No. 10, Oct. 1991, pp. 1551-1558.

Vena et al., "Chipless FRID Tag Using Hybrid Coding Technique," IEEE Transactions on Microwave Theory and Techniques, vol. 59, No. 12, Dec. 2011, pp. 3356-3364.

* cited by examiner

ITEM COMPRISING A BARCODE WITH AN ELECTROMAGNETIC SIGNATURE

CROSS REFERENCE TO RELATED APPLICATIONS

This application is a continuation of PCT Patent Application No. PCT/IB2013/055218, entitled "ITEM COMPRISING A BARCODE WITH AN ELECTROMAGNETIC SIGNATURE," filed Jun. 25, 2013, which claims priority to French patent application Ser. No. 12/56,083 filed on Jun. 26, 2012, which is herein incorporated by reference.

FIELD OF THE INVENTION

The present invention relates to the identification, authentication and/or traceability of one or more items.

BACKGROUND OF THE INVENTION

Optical codes, notably barcodes, are widely used at present to identify items, for example by being directly printed onto packaging or by being present on labels affixed to the items or their packaging. Optical codes are also found on various documents, notably security documents.

The term "security document" denotes a means of payment, such as a banknote, a check or a meal voucher, an identity document such as an identity card, a visa, a passport or a driver's license, a lottery ticket, a transport document or an admission ticket to a cultural or sporting event.

The article in the RFID Journal, "*Cent RFID Tags for Supermarkets*" by Bob Violino, states that there have been proposals to print barcodes on a paper in which conductive fibers have been dispersed, thereby permitting both an optical reading of the barcode and the creation of a unique identifier by means of the electromagnetic signature of the paper.

The publication WO 2012/005733 A1 discloses a 2D barcode formed by using a conductive ink. A chip including a short-range antenna is electromagnetically coupled to a longer-range antenna formed with the 2D barcode.

The application US 2005/0284941 A1 describes the forming of a barcode from the same material as at least a portion of an RFID communication device, for example from a sheet of conductive material that has been subjected to etching. The publication US 2007/0057054 A1 contains similar teachings.

The application EP 1 065 623 A2 discloses an electromagnetically readable barcode intended to replace optical barcodes and to overcome the difficulties encountered with the latter, such as dirt or obstructions that impede optical reading.

The application FR 2 956 232 concerns a chipless passive RFID label, comprising a plurality of separate parallel conductive strips formed on an electrical backing, with conductive links interconnecting neighboring conductive strips in such a way that the set of resonance frequencies of the label forms an identification code.

The publication WO 03/032242 A1 teaches the forming of a barcode with an ink containing light-emitting and/or electrically conductive substances. Printing is carried out with different thicknesses, enabling signals of different intensity to be generated.

The article entitled "*Evaluation of conductive inks for anti-counterfeiting deterrents*" by Jason S. Aronoff and Steven J. Simske mentions that the use of conductive ink may increase the number of ways of authenticating information printed on a package or a label. The author examines the print quality of a magnetic ink and of a novel silver-based conductive ink. The use of a 2D Data Matrix barcode is proposed as a test means for verifying the print quality. The article studies the effect of pre-compensation, a method in which the size of the print area of each elementary black square of the Data Matrix is reduced, as well as the effect of the substrate, on the barcode authentication success rate.

The article "*Printed Antennas for Combined RFID and 2D Barcodes*" by Steven J. Simske, Jason S. Aronoff, and Bobby Duncan discloses the use of a portion of a 2D barcode as an RFID antenna. Various possibilities for the forming of the antenna are mentioned, notably:
   the fact that two distinct inks having the same color are used, one ink being conductive, for forming the antenna, while the other is non-conductive, for forming the portion of the code bearing the data,
   the use of the same ink or the same conductive ink precursor to print the whole of the 2D barcode, only the portions to be used as an antenna being activated,
   the printing of the 2D barcode entirely in a conductive ink and the forming of fine breaks to isolate the portion forming the antenna from the portion bearing the data.

The article entitled "*RFID Fibers for Secure Applications*" authored by Jonathan Collins discloses the use of resonant nanofibers integrated into a paper backing to create a unique authentication key.

The article by E. Perret, M. Hamdi, A. Vena, F. Garet, M. Bernier, L. Duvillaret, and S. Tedjini, "*RE and THz Identification using a new generation of chipless RFID tags*," Radioengineering—Special Issue towards EuCAP 2012: Emerging Materials, Methods, and Technologies in Antenna & Propagation, Vol. 20, N° 2, pp. 380, 386, June 2011, describes a chipless RFID label including a combination of C-shaped coplanar strips and short-circuits, the set of resonance frequencies of the label forming an identification code. To broaden the frequency range available for detecting encoded information, the article also discloses a new type of chipless label having a multi-layered structure allowing operation in the THz range.

The document EP 1 675 040 A1 describes a marking having a plurality of areas, the marking having magnetic, electrical and/or electromagnetic properties differing from one area to another.

FR 2 899 361 A1 discloses a method of associating an authentication information element of a substrate with a barcode carried on the substrate.

WO 03/019502 A1 discloses a label having an optical code and a magnetic code, these codes being complementary so as to reinforce the security of the label.

WO 2006/108913 A1 discloses an electromagnetically readable marking, including areas having different electrical conductivities, in order to provide a large amount of information contained in the marking.

SUMMARY OF THE INVENTION

The invention is intended to propose a novel solution for identification and authentication and/or traceability, which is simple to use and fully compatible with the existing technology of optical codes, the optical codes preferably being barcodes.

Thus the invention proposes, according to a first of its aspects, a set of at least two items, notably documents, each including an optical code, notably a barcode, which is neither connected nor coupled to any electronic chip that may be carried by the item, the optical codes appearing to encode the same information for the same optical reader of optical codes, but having different respective electromagnetic signatures, these signatures being unique to each of the items.

Because of the invention, it is possible to identify each item by means of the optical code, by optical reading in a conventional manner, and it is also possible to identify it, authenticate it and/or ensure its traceability by reading its electromagnetic signature, this signature being unique to the item.

The invention does not require the use of an electronic chip connected or coupled directly or indirectly to the optical code, since it is the electromagnetic signature of the optical code itself that produces the information for identification, authentication or traceability. Reading takes place without contact, at a distance of about 50 cm for example.

The invention thus enables the functions of identification, authentication or traceability to be provided at very low cost, compared with a solution in which an antenna is coupled electromagnetically or connected electrically to an electronic chip.

Using the invention, it is therefore easy to trace, identify or authenticate each of the products sharing the same optical identifier.

The item according to the invention may have greater reliability and higher thermal and mechanical strength than an item incorporating an RFID chip. Similarly, the power transmitted by the reader and required for reading is less than that required with current RFID chips. The electromagnetic reading may take place at a distance, with or without a direct view of the optical code.

The invention further proposes, according to another of its aspects, an item including an optical code, notably a barcode, formed at least partially from an electrically conductive material, notably in order to create a set of items as defined above, this optical code having an electromagnetic signature and not being coupled or connected directly or indirectly to an electronic chip carried by the item, this item being characterized in that it includes at least one perturbing element which does not affect the information decoded by the optical reading of the optical code but which interacts electromagnetically with at least an electrically conductive portion of the optical code which contributes to the encoding of the optically read information, so as to provide the optical code with an electromagnetic signature connected to this perturbing element, notably connected to the positioning and/or the dimensions of the perturbing element, the perturbing element preferably being an interruption of an electrically conductive portion of the optical code, an electrically conductive link, and/or an electrically conductive element dispersed in or on a backing of the optical code.

The invention further proposes a method for the identification, authentication and/or traceability of an item according to the invention, including:
  the optical reading of the optical code, and
  the reading of an electromagnetic signature of the optical code.

The optical reading of the optical code makes it possible to identify the family to which the item belongs, the information decoded by the optical reading of the optical code being common to all the items making up said family, which are, for example, identical items offered to consumers at the same price.

On the other hand, the reading of the electromagnetic signature of the optical code provides information which enables this item to be distinguished from similar items within the same family carrying the same information decoded by the optical reading of the optical code, each of the items having a unique electromagnetic signature.

The electromagnetic signature that is read may be compared to a reference signature, for example a signature recorded at the moment of the fabrication or packaging of the item, this information being associated in a database with other information concerning, for example, the circumstances of the fabrication or packaging of the item, enabling the traceability and/or authentication to be provided.

The invention further proposes a method for the fabrication of an item according to the invention, in which:
  a preliminary optical code relating to the item and encoding information readable by the optical reader is generated, and
  at least one modification of the preliminary optical code is generated, which, without affecting the reading of the information decoded by optical reading of the optical code, modifies its electromagnetic signature.

Thus it is possible to fabricate a plurality of optical codes which supply the same information to an optical reader, but have electromagnetic signatures enabling them to be distinguished from one another.

The modification or modifications in question may relate, for example, as detailed above, to the addition of one or more perturbing elements which do not affect the information decoded by the optical reading of the optical code, but interact electromagnetically with at least one electrically conductive portion of the optical code, so as to provide an electromagnetic signature related to this perturbing element or these perturbing elements.

The modification or modifications may be made in a random or predetermined manner. If appropriate, it is possible to use only those randomly generated modifications that ensure the existence of a unique electromagnetic signature sufficiently different from the other signatures, for each optical code.

The invention further proposes, according to another of its aspects, a method for providing traceability of an item, in which an optical reading of the optical code and an electromagnetic reading of the optical code are carried out and information representative of the electromagnetic signature of the optical code is recorded, and/or the information read by the optical reader is recorded, the information representative of the electromagnetic signature being preferably recorded in correspondence with the information read by the optical reader.

As mentioned above, the electromagnetic reading may cause a change in the appearance of the optical code when electrochromic and/or thermochromic materials are used, this change of appearance being detectable and/or taking place after a modification of the temperature of the optical code, when a material whose shape changes in an electromagnetically detectable way with temperature is used.

The invention further proposes, according to another of its aspects, a device for the identification, authentication and/or traceability of an item according to the invention, including:
  an optical reader for reading an optical code encoding information readable by the optical reader, and
  an electromagnetic reader for reading an electromagnetic signature of the optical code and means for comparing information resulting from the reading of the electromagnetic signature of the optical code with reference information.

These means may include any computing means such as a computer, a microcomputer or specialized integrated circuit, suitable for performing all comparisons useful for the purposes of identification, authentication or traceability.

The reference information may be contained in a memory of the device and/or may be downloaded or contained in a remote server with which the device may communicate.

The device may be arranged to perform the reading of the optical code and of the electromagnetic signature in a substantially simultaneous way; that is to say, the item only has to be present at the device once in order to enable the device to perform both readings.

BRIEF DESCRIPTION OF THE DRAWINGS

The invention will be made clearer by the following detailed description of non-limiting exemplary embodiments thereof, and by the attached drawing, in which.

DETAILED DESCRIPTION OF THE INVENTION

The term "item" denotes a package, a document or a label, notably a security document, or, if appropriate, any object on which the optical code may be formed or onto which a backing of the optical code may be applied.

Optical Code

The term "optical code", according to the invention, denotes any arrangement for retrieving encoded information by optical reading, including, if appropriate, the underlying backing onto which the arrangement is applied or on which it is formed. This backing, together with said arrangement, forms, for example, an adhesive label to be stuck onto the item. The expression "optical code" is thus synonymous with "optical code device" for the purposes of the invention.

The optical code is preferably a barcode.

The term "barcode", according to the invention, denotes any arrangement for retrieving encoded information in the form of numeric and/or alphanumeric data by optical reading, this arrangement including elementary patterns which may, for example, be squares, dots, rectangles, hexagons or bars, together with, if appropriate, the backing onto which the arrangement is applied or on which it is formed, as required. Thus, the expression "barcode" also denotes an adhesive label carrying said arrangement, to be stuck onto an item.

These barcodes may, in particular, be one-dimensional. In this case they are formed at least partially of bars and spaces whose thickness varies according to the encoded data.

Examples of these are the EAN, Codabar Monarch, code 11, code 39, code 93, code 128, 2 of 5, and Nain code barcodes.

They may be multidimensional, having two or more dimensions, and may not include bars. However, these optical codes are still called barcodes, based on the customary designation of the first codes to appear, although this is a misuse of language.

When they are two-dimensional, the information is encoded, for example, in both the height and the width of the code, as for example in the "pdf-417" code, the "Data Matrix" code according to the ISO IEC 16022 standard, the "QR" code, the 16 K code, the 49 code, the One code, the Maxicode, the Aztec code, and the Bokode.

Preferably, each optical code according to the invention is formed at least partially from an electrically conductive material. For example, the optical code is formed at least partially by printing an electrically conductive ink which may or may not require activation by heat and/or radiation treatment, or by ablation, by demetallization for example, or by deposition, for example by metallization or controlled spraying of the conductive element.

In practice, all the conventional forming methods of electronics or microelectronics may be used, notably the following manufacturing techniques:

1) Thick layer methods such as screenprinting, screen etching or flexography.
2) Thin layer methods such as the techniques used for making printed circuits. These circuits are usually produced by etching a blank metal layer. This layer may be formed by deposition (in a vacuum, or electrolytic) or by lamination. The etching may be chemical (selective etching of the conductive and resistive layers) or mechanical (cutting and piercing with a milling machine, saw or laser, or ion etching, also called dry etching). In the first case, it may use the principle of single- and double-sided photolithography.
3) Techniques of printed electronics such as inkjet printing with conductive ink, in which the backings on which the printing is carried out may equally well be either plastic materials or paper.

The optical code may be capable of reflecting electromagnetic radiation, enabling an electromagnetic signature to be generated. The term "electromagnetic signature" denotes an electromagnetic spectrum produced by subjecting the optical code to a predefined electromagnetic radiation.

The electromagnetic signature may be read, for example, with the optical code at a distance of several tens of centimeters from an antenna of the reader. The reader includes a device for both transmitting and receiving electromagnetic radiation. The radiation may, in particular, be short-term pulses complying with the regulations in force in the country where the system is used. Thus an Ultra Wide Band (UWB) according to the standards specified by the European Telecommunications Standards Institute (ETSI) may be used in Europe. Similarly, in the USA the signal may conform to the standards specified by the Federal Communications Commission (FCC).

The reader may have a monostatic or bistatic configuration, depending on whether it uses one antenna or two antennas for transmitting and receiving the electromagnetic radiation separately. If the transmitted radiation is a short-term pulse, the receiving module samples in time the signal reflected by the optical code. The signature obtained in this way subsequently undergoes post-processing for the purpose of extracting from it the useful information, which may be represented either as a function of time or as a function of the signal frequency. The measurement may be made in a controlled environment, for example in an anechoic environment. The reader may advantageously excite and acquire the electromagnetic radiation so that the optical code can be characterized in a plurality of polarizations. Similarly, the reader may use techniques of diversity of positions so as to increase the richness of the information captured from the optical code. By way of example, the item may be positioned at a predetermined distance from the reader and in a configuration (orientation in space, placing on a backing or otherwise) which is entirely controlled and reproducible. If the reader is encapsulated in an enclosure not allowing electromagnetic radiation to pass outward, the frequency band used might fail, to some extent, to be constrained by the current regulations.

The reading of the electromagnetic signature allows automatic capture at short range, which is a considerable advantage in a large number of applications.

The optical code is preferably visible in daylight, being, for example, black on a white or colored background. In a variant, the optical code is visible under UV or IR illumination, because of the use of at least one luminescent, notably fluorescent, compound. In this case, the reading of the optical code may require UV or IR illumination.

The optical code may incorporate a digital watermark or may be formed by a digital watermark.

The optical code may include substances having an interference effect, notably iridescent particles, for example mica-based particles coated with at least one metal oxide, for example $TiO_2$.

The optical code may include a touch recognition element.

The optical code may include substances having an interference effect, notably iridescent particles, combined with a touch recognition element, as disclosed by the application WO 2008/053130 A2.

This code may be produced by coating or by printing.

The expression "optical code neither connected nor coupled to an electronic chip" signifies that the optical code is not electrically connected by electrical conduction to an electronic chip, nor does it form an antenna which is coupled electromagnetically to another antenna which is itself connected to an electronic chip, as would be the case in what is known as a booster antenna intended to increase the reading range of an electronic chip connected to a short-range antenna.

The term "electronic chip" denotes any electronic integrated circuit. The more complex of these circuits may include a memory and a processor allowing at least one identifier to be transmitted when interrogated by an external reader.

The optical codes according to the invention may have unique electromagnetic signatures, by using at least one perturbing element and/or by being made with electrically conductive areas arranged differently.

Electrically Conductive Areas Arranged Differently

In an exemplary embodiment of the invention, the optical code is formed with electrically conductive areas arranged differently from one optical code to another, for optical codes encoding the same information for the optical reader.

For example, a variable portion of the optical code is formed with an electrically conductive ink, and the missing portions of the optical code are formed with a non-conductive ink, or without ink. The variable part formed with the conductive ink differs from one optical code to another. Thus, each optical code has a unique electromagnetic signature, but encodes the same information for the optical reader.

Perturbing Elements

Each optical code may include one or more perturbing elements which do not affect the information decoded by the optical reading of the optical code, but interact electromagnetically with at least one electrically conductive portion of the optical code, this perturbing element or these perturbing elements being arranged differently from one optical code to another, so as to give the optical codes unique electromagnetic signatures related to this perturbing element or these perturbing elements.

The perturbing elements may all be of the same size. In a variant, at least one dimension of at least one perturbing element may vary from one optical code to another, notably its length, for optical codes seen by the optical reader as encoding the same information.

The perturbing elements may take the form of one or more interruptions and/or one or more material links and/or one or more electrically conductive elements dispersed in a backing of the optical code.

The perturbing elements are arranged differently from one optical code to another, while these optical codes are seen by the optical reader as encoding the same information.

The perturbing elements are preferably present in a large number in the optical code.

By way of example, the number of perturbing elements, in the case of interruptions and/or one or more material links, is between 2 and 1000 times the number of electrically conductive areas that can be identified in the optical code.

The amount by mass of perturbing elements, in the case of electrically conductive elements dispersed in a backing of the optical code, is preferably between 1% and 70% of the total mass of the backing.

The expression "elements arranged differently from one optical code to another" signifies that the elements are placed differently from one optical code to another and/or that they have different sizes or shapes. The expression "different sizes" may refer to the length, the width and/or the thickness.

The optical code may be formed by one or more interruptions, preferably extending between at least two electrically conductive areas of the optical code, each interruption preferably having a submillimetric width, or more preferably having a width less than or equal to 100 µm. A small interruption width makes it possible not to perturb the optical reading of the optical code to the point of no longer allowing the optical reader to read the information encoded by the optical code, while permitting the creation of an electrical discontinuity which thus has a detectable effect during the reading of the electromagnetic signature.

An interruption of the optical code may electrically isolate two electrically conductive areas of the optical code, or, in a variant, may modify a dimension of an electrically conductive area and thus change, for example, the resonance frequency of this electrically conductive area, which may act as a tunable resonator of the corresponding antenna strand. In the latter case, the interruption is, for example, formed on a side of an elementary pattern of the optical code that does not face another elementary pattern.

The interruption may have straight sides which are parallel to each other.

In an exemplary embodiment of the invention, each optical code includes strips and at least one interruption is placed on at least one strip and/or each optical code is in matrix form, including an elementary pattern which is repeated in two perpendicular directions, at intervals which are multiples of a non-zero integer, the interruption being located at an elementary pattern, the smallest dimension of the interruption being smaller than the smallest dimension of the elementary pattern, the elementary pattern preferably being a square.

The item may also include one or more electrically conductive links, this link or these links being arranged differently from one optical code to another, for optical codes seen by the optical reader as encoding the same information. Preferably, the conductive link or links are superimposed on the parts of the optical code that encode the information readable by the reader, notably on electrically conductive areas of the optical code which encode the optical information, and may connect electrically conductive areas of the optical code that encode the optical information.

The positioning and/or the geometry and/or the thickness of the conductive link or links may differ from one item to another, and may give each of the optical codes a unique electromagnetic signature.

The conductive link or links may define, at least partially, the information decoded by the optical reading of the optical code. In a variant, the conductive link or links may not form any part of the information decoded by the optical reading of the optical code, being, for example, invisible to the optical reader or merged with areas encoding the optical information.

Each optical code may include a backing which contains electrically conductive elements dispersed in the backing, preferably in a random manner. The security protection of the backing is increased when the random dispersion of the electrically conductive elements cannot be reproduced identically. Furthermore, the unique dispersion of the electrically conductive elements gives the electromagnetic signature its uniqueness.

Each optical code may include a backing with electrically conductive elements dispersed on its surface, preferably in a random manner.

The backing may be of the polymeric or fibrous type.

The backing may be a substrate, notably a fibrous substrate.

The electrically conductive elements may include electrically conductive fibers, in which case the backing is preferably fibrous.

The backing may be printed, the printing encoding the information that will be read by the optical code reader.

The electrically conductive elements may be added before the fabrication of the backing or during its formation. In the case of a fibrous substrate, the electrically conductive elements can be deposited at the wet end, or by spraying, as disclosed in the document WO 2007/135334 A1.

The electrically conductive elements may be deposited by coating on the surface of the backing, in order to improve the contact between the electrically conductive elements and the electrically conductive areas. In this case, the backing may be a non-fibrous substrate, for example a substrate as disclosed in the document FR 2951867 A1, or a fibrous substrate. In the case of a fibrous substrate, a pre-treatment is preferably carried out to provide a non-porous substrate having a uniform surface free of irregularities. The electrically conductive elements are preferably fibers.

Presence of a Thermochromic or Electrochromic Material

Each optical code may include a thermochromic material thermally coupled to a region of the optical code capable of becoming heated when subjected to electromagnetic radiation, notably the radiation used for reading the electromagnetic signature of the optical code, in such a way that the reading of the electromagnetic signature of the optical code with sufficient power causes an increase in the temperature of the optical code and a change in the appearance of the thermochromic element.

The thermochromic elements may be chosen from among organic and inorganic pigments, leuco dyes and liquid crystals.

Each optical code may include at least one electrochromic material electrically coupled to a region of the optical code subject to the appearance of an electrical field when the optical code is exposed to electromagnetic radiation, notably the radiation used for reading the electromagnetic signature, in such a way that the reading of the electromagnetic signature of the optical code with sufficient power causes a change in the appearance of the electrochromic element due to the effect of the electrical field circulating in the optical code.

The use of a thermochromic or electrochromic material may thus provide additional security, enabling a change in the appearance of the optical code to be detected during the reading of the electromagnetic signature, for example.

Materials Whose Shape Varies with Temperature in a Reversible Manner

Each optical code may also include, in addition to one or more electrically conductive areas, and one or more perturbing elements if present, one or more materials, preferably electrically conductive or carrying electrically conductive elements, whose shape varies with temperature in a reversible manner, the distribution of this material or these materials and their variation with temperature giving the optical code a unique signature.

The distribution of a material of this type, whose shape varies with temperature between temperature $T_1$ and $T_2$, may make it possible to differentiate, at one of the temperatures $T_1$, a plurality of optical codes having the same electromagnetic signature at the other temperature $T_2$ which is different from $T_1$, because of the change in shape of this material between the optical code at the temperature $T_2$ and those at the temperature $T_1$. This is because the deformation of this material due to the effect of temperature causes, for example, the deformation of the electrically conductive area or areas and of any perturbing element or elements that may be present. If each optical code has a unique distribution of the material whose shape varies with temperature, this results in a unique variation of the electromagnetic signature due to the effect of temperature, and increased security.

A reading of the electromagnetic signature of the optical code can be carried out at a first temperature, and then at a second temperature, and these two signatures can be compared with reference data so that the item can be traced, identified and/or authenticated.

The material whose shape varies with temperature in a reversible manner is arranged in such a way that the information decoded by the optical reading of the optical code is not affected at the measurement temperatures.

Figure 1:
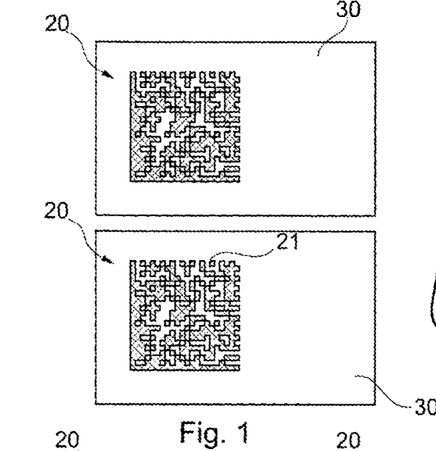
FIG. 1 depicts schematically, from above, a set of optical codes according to the invention.

FIG. 1 shows a set of items according to the invention, each including an optical code 20, the latter also being called an optical code device.

The items are, for example, documents such as adhesive labels laid on a non-adhesive sheet, and include, in the example in question, a backing 30 of the fibrous or polymeric substrate type, provided, for example, with an adhesive layer on its face opposite the arrangement encoding the optical information.

If the item is an adhesive label whose function is to carry the optically encoded information to be read by the optical code reader, this item may be considered equivalent to the optical code itself.

The optical code 20 is, for example, as illustrated, a 2D barcode, for example a Datamatrix or QR code, including a set of elementary patterns 21, in the form of squares in the illustrated example, arranged in a gird, the positioning of the elementary patterns determining the optically encoded information.

The optical code 20 is formed at least partially from at least one conductive material, for example an electrically conductive ink or a backing that has been subjected to vacuum metallization and/or selective demetallization, so as to have an electromagnetic signature.

For example, the optical code 20 is formed by inkjet printing, screen printing, flexography or gravure printing on a backing with a conductive ink including silver particles, for example. Alternatively, the conductive ink may be deposited by spraying. The backing on which the printing is performed may be that of the item to be associated with the optical code, for example when the item is a document, or a backing unique to the optical code 20, for example when the optical code is fabricated separately and then applied to an item to be associated with the optical code, in the form of an adhesive label for example.

The identity of the information decoded by the optical reading of the optical code 20 of the items shows that the items belong to the same family of objects.

According to the invention, the items have distinct electromagnetic signatures at the optical codes 20.

Figure 2:
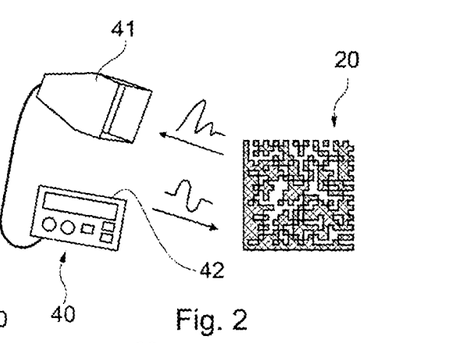
FIG. 2 depicts the optical and/or electromagnetic reading of an optical code according to the invention.

In order to read an optical code 20 according to the invention, any suitable reading device 40 can be used, as shown in FIG. 2, the device including an optical sensor and one or more reading antennas for transmitting and receiving electromagnetic radiation, and means for processing the signals collected by the optical sensor and the reading antenna in order to provide useful information.

During the reading, the electromagnetic reader sends electromagnetic radiation toward the optical code. The optical code, like a radar object, reflects radiation toward the reader, this radiation including an electromagnetic signature EM specific to the optical code. The reader processes this signature and may retrieve information unique to the optical code.

The spectrum of the frequencies of the electromagnetic radiation generated by the reader may cover a band occupied by radio waves, microwaves or THz waves, in other words, approximately, a frequency sub-band in the range from 100 MHz to 30 THz. By way of example, a short-term pulse conforming to the communications standards specified by the regulatory statutes of the countries where the system is used could advantageously be used. This pulse may extend over the frequency band commonly called the Ultra Wide Band (UWB) which comprises frequencies from 3 GHz to 10 GHz. Subject to compliance with the transmission power and the frequency of repetition of the signal transmission, this band is freely accessible in many countries, notably in Europe and North America.

Other frequency bands may also be used, such as ISM (Industrial, Scientific and Medical) bands, notably the bands centered on the following frequencies: 24.125 GHz, 61.250 GHz, 122.5 GHz and 245 GHz.

As a general rule, the choice of the frequency band is dependent on the geometrical dimensions of the conductive elements present in the optical code. Thus, frequencies having wavelengths of the same order of magnitude as the aforementioned geometrical dimensions are advantageously used. By way of example, for 2D barcodes having listed standard dimensions between 0.5 cm and 10 cm, frequency bands from 3 to 10 GHz, 24 to 24.25 GHz or 61 to 61.5 GHz are preferably used.

When the raw electromagnetic signature of the optical code has been captured, the signal is processed in the reader in order to extract from it the useful information, that is to say the information permitting the specific identification or authentication of the interrogated optical code. By way of example, a conventional calibration procedure, as disclosed in the articles by W. Wiesbeck and D. Kähny, "*Single reference, three target calibration and error correction for monostatic, polarimetric free space measurement*", Proc. IEEE, vol. 79, no. 10, pp. 1551-1558, October 1991 and A. Vena, E. Perret and S. Tedjini, "*Chipless RFID Tag Using Hybrid Coding Technique*", IEEE Transactions on Microwave Theory and Techniques, Vol. 59, Issue 12, pp. 3356-3364, December 2011, may advantageously be used to enable the intrinsic behavior of the optical code to be extracted from the recorded signal. This procedure makes it possible to remove the electromagnetic perturbations induced by the environment near to the item which may perturb the unique information of the optical code. In this case, various kinds of action can be taken, for example without the item present, or alternatively with one or more reference objects.

In the illustrated example, the reading device 40 incorporates into the same handpiece 41 the optical sensor of the optical code reader and the antenna of the electromagnetic reader, but in a variant embodiment the optical sensor of the optical code reader and the antenna of the electromagnetic reader are distinct elements. The handpiece 41 may be connected to a signal processing apparatus 42. The term "handpiece" denotes an apparatus or a part of an apparatus that can be held in the hand.

Examples of commercially available optical code readers are those marketed under the Leuze (BCL22) and SICK (ICR-845) brands, which are industrial readers, and those marketed under the Symbole (repurchased by Motorola) and Honeywell brands, which are manual readers.

Examples of commercially available electromagnetic readers are the impulse radar made by Novelda (Chip ref.: NVA6100-PQ32/Development kit ref. NVA-R640) and the FMCW radar made by SiversIMA (Module ref.: RS3400, Dev. Kit ref.: CO1000A/00).

The optical reading and the electromagnetic reading may be carried out simultaneously or successively.

According to one aspect of the invention, one or more perturbing elements are used to provide the optical code 20 with a unique electromagnetic signature.

In the example of FIGS. 3A to 3E and 4, this perturbing element or these perturbing elements take the form of interruptions 23, each placed between at least two electrically conductive areas 24 and 25 of the optical code, these electrically conductive areas consisting, for example, as illustrated, of one or more elementary patterns of the optical code which are electrically interconnected, for example patterns formed by squares.

The interruptions 23 are arranged differently from one optical code to the next, in such a way that the difference in the arrangement of the interruptions modifies the behavior of the optical code relative to the incident radiation of the electromagnetic reader. The signature which is detected is thus different from one optical code to another, because it is highly dependent on the arrangement of the interruptions 23 within each optical code.

Figure 3A:
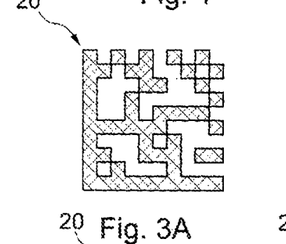
FIG. 3A depicts a first example of an optical code according to the invention.
Figures 3B, 3C:
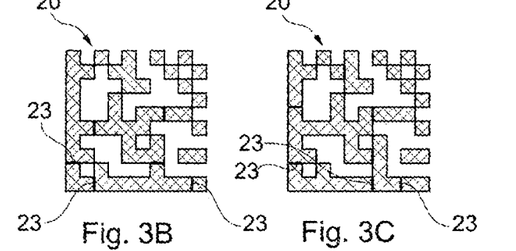
FIG. 3B depicts a second example of an optical code having the same optically encoded information as the first example but a different electromagnetic signature.
FIG. 3C depicts a third example of an optical code having the same optically encoded information as the first example but a different electromagnetic signature.
Figures 3D, 3E, 4:
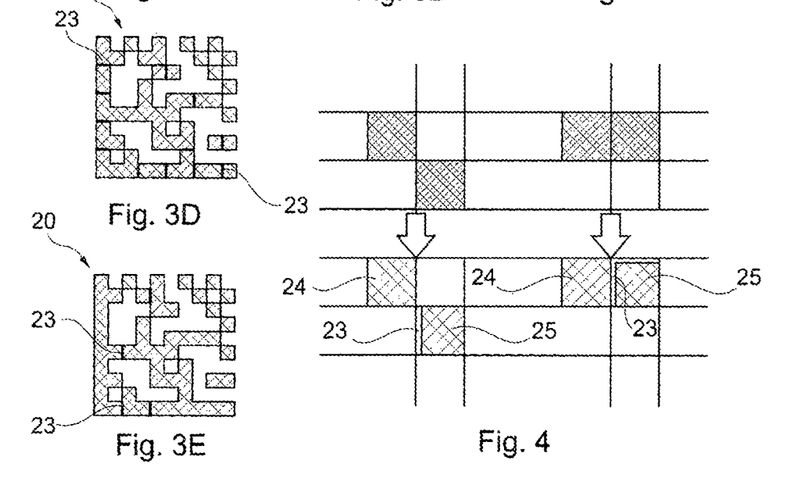
FIG. 3D depicts a fourth example of an optical code having the same optically encoded information as the first example but a different electromagnetic signature.
FIG. 3E depicts a fifth example of an optical code having the same optically encoded information as the first example but a different electromagnetic signature.
FIG. 4 depicts an exemplary embodiment of perturbing elements on an optical code.

In the example of FIGS. 3A to 3E, the interruptions take the form of straight or L-shaped slits, for example, having a width less than or equal to 100 µm, and extending over one or more sides of an elementary pattern, as shown in FIG. 4.

Taking the example of FIGS. 3A to 3E, it is possible to count precisely the set of different configurations obtained simply by adjusting the introduction or non-introduction of an interruption 23 in the form of a slit between two juxtaposed squares. This number of different configurations is extremely large; about 180 contiguous sides of squares, that is to say about $2^{180}$ configurations, can be identified by a rapid calculation.

The interruptions 23 may be generated during the printing of the patterns of the optical code 20 if an electrically conductive ink is used, by printing an optical code which has the intended defects formed by the interruptions 23. These interruptions are sufficiently fine not to affect the optical reading of the optical code, but they affect its electromagnetic signature by modifying the distribution of the conductive areas in the optical code. The slits do not have to be very wide; provided that metallic conduction can no longer take place between two contiguous metal parts, a measurable variation of the electromagnetic signature can be obtained.

Figure 5:
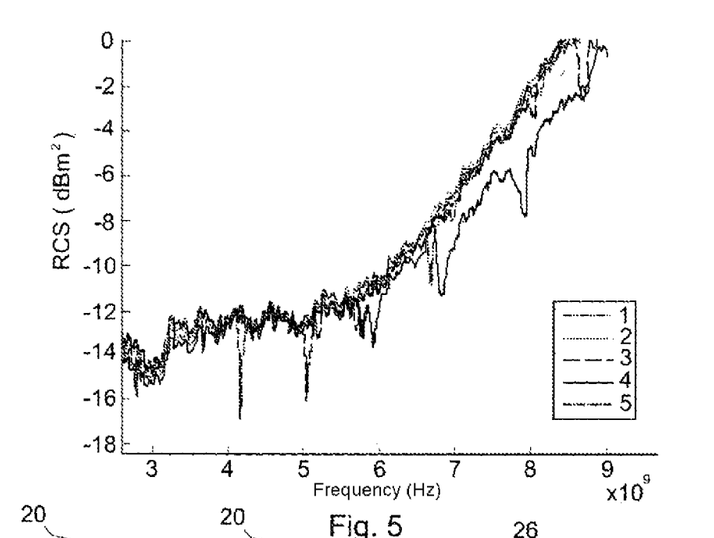
FIG. 5 depicts examples of electromagnetic spectra.

FIG. 5 shows measurements of the radar cross-section (RCS) of the optical codes shown in FIGS. 3A to 3E. Each optical code belonging to the same family has a different radar cross-section.

Perturbing elements other than interruptions in slit form may be used to modify the electromagnetic signature of the optical code, while allowing two optical codes having different electromagnetic signatures to be read as encoding the same information by an optical reader.

Figures 6A, 6B, 6C, 7A, 7B, 8, 9A, 9B:
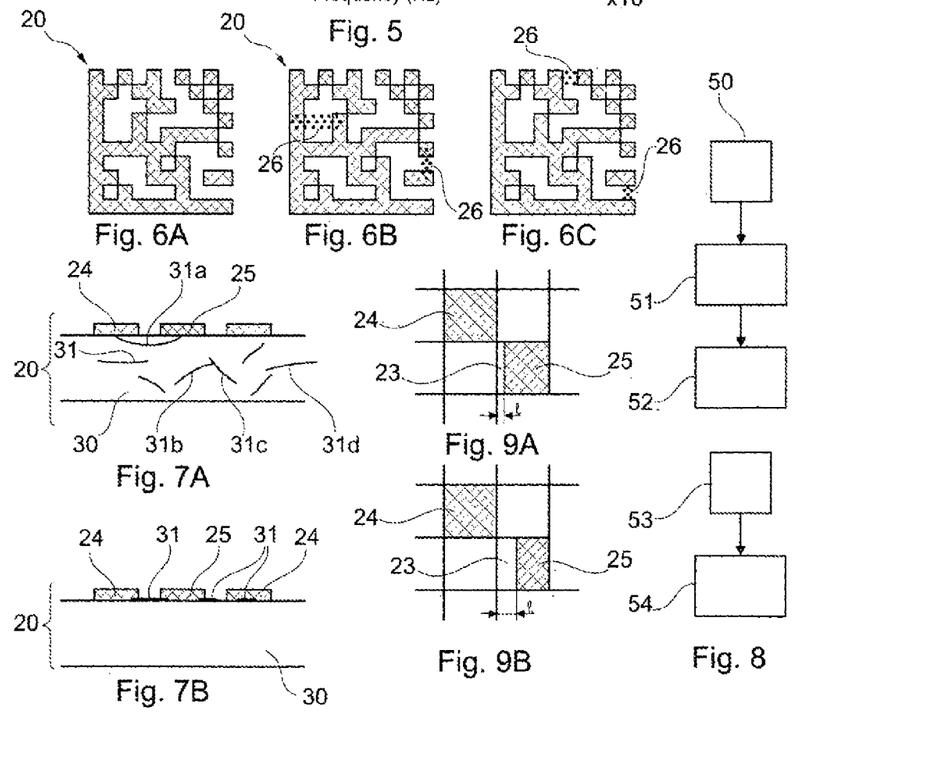
FIG. 6A depicts a first embodiment of an optical code according to the invention.
FIG. 6B depicts a second embodiment of an optical code having the same encoded information as the first embodiment but a different electromagnetic signature.
FIG. 6C depicts a third embodiment of an optical code having the same encoded information as the first embodiment but a different electromagnetic signature.
FIG. 7A depicts a sectional view of a first embodiments of an optical code according to the invention.
FIG. 7B depicts a sectional view of a second embodiments of an optical code.
FIG. 8 is a block diagram showing an example of a method of fabricating and reading an item according to the invention.
FIG. 9A depicts a first embodiment of a perturbing element.
FIG. 9B depicts a second embodiment of a perturbing element.

For example, as shown in FIGS. 6A to 6C, electrically conductive links 26, which do not affect the optical reading of the optical code, may be used to modify its electromagnetic signature. These electrically conductive links 26 are, for example, partially superimposed on the conductive areas of the optical code, being for example printed with an ink which is optically transparent but electrically conductive. In this case, the links come into contact electrically with conductive areas of the optical code, but do not modify the optically encoded data. The transparent conductive ink used may be an ink based on indium tin oxide (ITO), carbon nanotubes (Eikos), metal nanoparticles (Ulvac), or organic polymers (Agfa).

In a variant, electrically conductive links are formed with an electrically conductive ink or material which is non-transparent, but their dimensions are sufficiently small not to affect the optical reading of the code.

In a variant, the electrically conductive links do not come directly into electrical contact with the conductive areas of the optical code, but extend to a distance sufficiently close to these areas to affect the electromagnetic signature of the optical code. For example, the electrically conductive links are printed on the face of the backing opposite that which carries the arrangement encoding the optical information, in a superimposed manner with respect to the backing.

The electrically conductive links may also be printed on the backing, before the printing of the electrically conductive areas of the optical code.

If necessary, as shown in FIGS. 9A and 9B, in order to make the electromagnetic signature specific to the item, the defects for perturbing the electromagnetic signature of the optical code have the same general distribution on the optical codes of the different items, but are, for example, of variable width from one optical code to another. Thus the distance between two electrically conductive areas of the optical code is modified, and the electromagnetic signature is changed as a result of the modification of this distance. The distribution of the perturbing elements may vary, together with their dimensions, if necessary.

The fact that a dimension of the perturbing elements, for example the width of the slits, is adjusted makes counterfeiting more difficult, because a counterfeiter would have to measure said dimensions precisely with a microscope before being able to reproduce the optical code.

The perturbing element or elements may or may not contribute to the encoding of the optical information.

A white or reflective conductive ink may be used to form the conductive links, if necessary.

The interruption or interruptions are preferably formed with sufficiently small dimensions not to interfere with the optical reading of the optical code. If the interruptions are formed with dimensions that may interfere with reading, an electrically non-conductive ink is advantageously deposited at the interruptions so as to fill in the missing portions of the optical code and reconstitute the code optically.

The interruption or interruptions may be generated during the printing of the optical code, by calculating a print file which, when transferred to a printer, causes the optical code to be formed with the interruptions. In a variant, the optical code is printed in its entirety without the interruption or interruptions, and an additional treatment is carried out to form the interruptions, for example a laser ablation which burns the electrically conductive ink locally and creates electrical discontinuities.

The smallest dimension of the perturbing elements, whether made in the form of interruptions or conductive links, is between 1 and 10 µm, for example.

Many perturbing elements having a very large form factor, for example conductive nanowires, may also be used. In this case, they must be present in a large number to have an effect. Their diameter is nanometric and their length may be several microns.

In the variants shown in FIGS. 7A and 7B, the optical code 20 includes electrically conductive areas 24 and 25 and a backing 30 which includes electrically conductive elements 31 dispersed within it as shown in FIG. 7A, or on its surface as shown in FIG. 7B, acting as perturbing elements.

For example, the backing 30 is a fibrous substrate, preferably paper, and the electrically conductive elements 31 are electrically conductive fibers, preferably dispersed in a random way within this fibrous substrate. These electrically conductive fibers will interact with the electrically conductive areas of the optical code 20 and thus modify the electromagnetic signature of the code.

The shape and concentration of the conductive elements enable a new electromagnetic response to be incorporated into the backing, thus modifying the electromagnetic response of the optical code. This is because the conductive elements inserted into the backing create coupling effects between the conductive areas of the optical code.

The conductive elements provide capacitive or inductive effects according to their positioning relative to one another and their positioning with respect to the conductive areas of the optical code. These effects are a function of the configuration of the electrically conductive elements in the backing. Thus, two optical codes appearing to encode the same information for the same optical reader and having random inclusions of electrically conductive elements in their backing will have different electromagnetic signatures.

The electrically conductive elements 31 may, for example, connect two electrically conductive areas 24, 25 participating in the optical encoding, as shown by the electrically conductive elements 31a in FIG. 7A. They may also be in contact with one another within the backing, as are the electrically conductive elements 31b and 31c of FIG. 7A, or may be electrically isolated in the backing, as is the electrically conductive element 31d.

The distribution of the conductive elements 31 may be carried out during the production of the backing.

Cellulose fibers used for the fabrication of security documents are preferably used to form the fibrous substrate.

The conductive elements 31 may be added before the fabrication of the backing or during its formation. In the case of a fibrous substrate, the conductive elements 31 can be deposited at the wet end, or by spraying, as disclosed in the document WO 2007/135334 A1.

The electrically conductive elements 31 may be deposited by coating on the surface of the backing 30, in order to improve the contact between the electrically conductive elements 31 and the electrically conductive areas 24, 25. In this case, the backing 30 may be a non-fibrous substrate, for example a substrate as disclosed in the document FR 2951867 A1, or a fibrous substrate. In the case of a fibrous substrate, a pre-treatment is preferably carried out to provide a non-porous substrate having a uniform surface free of irregularities. The electrically conductive elements 31, preferably fibers, have a size suitable for the coating system and the characteristics of the coating. For example, in the case of air blade deposition of a coating of 10 $g/m^2$ (i.e. approximately 10 µm dry), the diameter of the fibers is less than 15 µm (1.7 dtex) and their length is less than 3 mm.

Preferably, the conductive elements 31 are in the form of fibers or particles. The conductive fibers may have different cross sections (circular, trefoil, or rectangular, for example) and shapes (undulating, cranked or linear, for example), lengths preferably in the range from 0.1 to 20 mm and a count preferably in the range from 0.8 to 30 dtex.

The term "particles" denotes elements with a D50 size of less than 0.5 mm, or preferably less than 0.1 mm, which may take the form of leaves, flakes, tubes, spheres, or other shapes.

The method disclosed in patent EP 2 148 954 may be used to assist in the retention and concentration of the conductive elements within the backing, if necessary.

The conductive elements of the backing are preferably introduced in a proportion of 1% to 70%, or preferably from 10% to 20%, by mass relative to the total mass of the backing.

The conductive elements may be organic or inorganic, preferably based on carbon, semiconductor materials which may or may not be doped (for example silicon), or a metal, or may have an inclusion or coating of a metallic element.

The chosen metal is preferably selected from among steel, stainless steel, nickel, gold, silver, platinum, copper and aluminum.

FIG. 8 shows different steps of a method of fabricating and reading an item according to the invention.

In a first step 50, the preliminary optical code 20 for a family of products to be identified is formed. This preliminary optical code may be generated by a computerized method in a conventional way. In step 51, one or more perturbing elements, in the form of interruptions or links of material for example, are generated within the file of the preliminary optical code, in a random manner for example, so as to allow the production of a plurality of optical codes encoding the same information for optical reading but having different electromagnetic signatures.

For a given preliminary optical code, which optically encodes information, it is thus possible to generate perturbing elements in a random manner, enabling it to be given a unique signature subsequently. This is even more useful because, in practice, the information decoded by optical reading is identical for the whole of the same family of products. By adding perturbing elements, it is possible to trace each product in a unitary way within this family.

In step 52, the electromagnetic signature of the optical code is read and stored as a reference. This reference signature may be associated with other information relating to the item associated with the optical code, for example its date of fabrication, its lot number, the place of production, or the like.

This other information is, for example, stored in a database which may be accessed by means of information linked in one-to-one manner with the electromagnetic signature.

Alternatively, this other information, with the electromagnetic signature if necessary, may be recorded in another code present on the item. Thus, without access to a database, it is possible to monitor the item and also to authenticate the item by comparing information relating to the electromagnetic signature with information relating to the other code present on the item, this other code present on the item possibly taking the form of an optical code, for example a barcode or an alphanumeric code.

Subsequently, the optical code may be read in step 53 and the electromagnetic signature may also be read, in step 54. By comparing this signature with reference electromagnetic signatures, it is possible to trace the data listed in the database as being associated with the item carrying the optical code, and to authenticate the item.

As a general rule, the item may have one or more additional security elements as defined below.

Some of the additional security elements are detectable to the eye, in daylight or in artificial light, without the use of any special apparatus. These security elements include, for example, colored fibers or planchettes, and printed or totally or partially metallized threads. These security elements are called first-level elements.

Other types of additional security elements are detectable only by using a relatively simple apparatus such as a lamp emitting in the ultraviolet (UV) or infrared (IR). These security elements include, for example, fibers, planchettes, strips, threads or particles. These security elements may or may not be visible to the naked eye, being for example luminescent under illumination by a Wood lamp emitting at a wavelength of 365 nm. These security elements are called second-level elements.

Other types of additional security elements require more sophisticated detection apparatus for their detection. These security elements are, for example, capable of generating a specific signal when they are subjected, simultaneously or otherwise, to one or more external excitation sources. The automatic detection of the signal enables the document to be authenticated, if appropriate. These security elements include, for example, tracers in the form of active materials, particles or fibers, capable of generating a specific signal when these tracers are subjected to optoelectronic, electrical, magnetic or electromagnetic excitation. These security elements are called third-level elements.

The additional security elements present within the item, notably when the item is a document, may have security characteristics of the first, second or third level.

The conductive links may be replaced by "dielectric" links with a dielectric constant that may be greater or smaller in order to create a greater or smaller capacitive effect and change the electromagnetic response of the optical code. The links may also have magnetic properties, if appropriate.

In the same way, the conductive elements of the backing may be replaced by "dielectric" elements with a dielectric constant that may be greater or smaller in order to create a greater or smaller capacitive effect and change the electromagnetic response of the optical code. The conductive elements may also have magnetic properties.

Conductive inks having different conductivities may be used to print the optical code and to obtain different electromagnetic signatures according to the distribution of the inks.

It is also possible to use magnetic inks.

The expression "including a" is to be understood as being synonymous with "including at least one", unless specified otherwise.

What is claimed is:

1. A set of security documents, comprising:
   at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, the electromagnetic signatures being unique to each of the items.

2. The set as claimed in claim 1, wherein the optical code of each item is formed at least partially from an electrically conductive material, preferably an electrically conductive ink.

3. The set as claimed in claim 1, wherein each item comprises one or more perturbing elements which do not affect the information decoded by the optical reading of the optical code, but interact electromagnetically with at least one electrically conductive portion of the optical code and are arranged differently from one optical code to another, so as to give the optical codes unique electromagnetic signatures related to this perturbing element or these perturbing elements.

4. The set as claimed in claim 3, wherein at least one dimension, notably the width, of the perturbing elements varying from one optical code to another.

5. The set as claimed in claim 3, wherein the position of at least one of the perturbing elements varying from one optical code to another.

6. The set as claimed in claim 3, wherein each optical code including strips is formed at least partially from an electrically conductive material and at least one interruption being placed on at least one strip and/or each optical code being in matrix form, including an elementary pattern which is repeated in two perpendicular directions, at intervals which are multiples of a non-zero integer, the interruption being located at an elementary pattern, the smallest dimension of the interruption being smaller than the smallest dimension of the elementary pattern, the elementary pattern preferably being a square.

7. The set as claimed in claim 1, wherein the optical codes have electrically conductive areas arranged differently from one optical code to another.

8. The set as claimed in claim 1, wherein at least one of the items comprises one or more interruptions of the optical code, preferably extending between at least two electrically conductive areas of the optical code, the interruption preferably having a submillimetric width, or more preferably having a width less than or equal to 100 µm.

9. The set as claimed in claim 8, wherein the interruption does not affect the information decoded by the optical reading of the optical code.

10. The set as claimed in claim 1, wherein at least one of the items comprises one or more electrically conductive links superimposed on the parts of the optical code that encode the information readable by the optical reader, this link or these links being arranged differently from one optical code to another, the conductive link or links preferably being superimposed on conductive areas of the optical code, and more preferably connecting conductive areas of the optical code.

11. The set as claimed in claim 10, wherein the positioning, the thickness, or both of the electrically conductive links differ from one item to another, and give each of the optical codes a unique electromagnetic signature.

12. The set as claimed in claim 10, wherein the electrically conductive link defines, at least partially, the information decoded by the optical reading of the optical code.

13. The set as claimed in claim 10, wherein the electrically conductive link does not define the information decoded by the optical reading of the optical code.

14. The set as claimed in claim 1, wherein each optical code comprises a backing which contains electrically conductive elements dispersed in the backing, preferably in a random manner.

15. The set as claimed in claim 14, wherein the backing is a polymeric or fibrous substrate.

16. The set as claimed in claim 14, wherein the electrically conductive elements comprise electrically conductive fibers, the backing being preferably fibrous.

17. The set as claimed in claim 1, wherein each optical code comprises a thermochromic material thermally coupled to a region of the optical code capable of becoming heated when subjected to electromagnetic radiation, notably the radiation used for reading the electromagnetic signature of the optical code, in such a way that the reading of the electromagnetic signature of the optical code causes an increase in the temperature of the optical code and a change in the appearance of the thermochromic element, the thermochromic material being preferably chosen from among organic and inorganic pigments, leuco dyes, and liquid crystals.

18. The set as claimed in claim 1, wherein each optical code comprises at least one electrochromic material electrically coupled to a region of the optical code subject to the appearance of an electrical field when the optical code is exposed to electromagnetic radiation, notably the radiation used for reading the electromagnetic signature, in such a way that the reading of the electromagnetic signature of the optical code causes a change in the appearance of the electrochromic element due to the effect of the electrical field circulating in the optical code.

19. The set as claimed in claim 1, wherein each optical code comprises at least one material whose shape varies with temperature in a reversible manner, in such a way that the electromagnetic signature changes with temperature.

20. A method for the identification, authentication, or traceability of a set of security documents, comprising:
providing a set of at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, the electromagnetic signatures being unique to each of the items;
optically reading the optical code, and
reading an electromagnetic signature of the optical code.

21. The method as claimed in claim 20, wherein the electromagnetic signature is compared with a reference signature.

22. A method for the fabrication of a set of at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, the electromagnetic signatures being unique to each of the items, the method comprising:
generating a preliminary optical code relating to the item and encoding information readable by the optical reader, and
generating at least one modification of the preliminary optical code, which, without affecting the reading of the information decoded by optical reading of the optical code, modifies its electromagnetic signature.

23. A method for providing traceability of an item, comprising:
providing a set of at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, these signatures being unique to each of the items;
wherein an optical reading of the optical code and an electromagnetic reading of the optical code are carried out and information representative of the electromagnetic signature of the optical code is recorded, or the information read by the optical reader is recorded, the information representative of the electromagnetic signature being preferably recorded in correspondence with the information read by the optical reader.

24. A device for the identification, authentication, or traceability of a set of at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, the electromagnetic signatures being unique to each of the items, the device comprising:
an optical reader for reading an optical code encoding information readable by the optical reader, and
an electromagnetic reader for reading an electromagnetic signature of the optical code, and
means for comparing information resulting from the electromagnetic reading of the optical code with reference information.

25. An item including an optical code, notably a barcode, formed at least partially from an electrically conductive material, comprising:
a set of at least two items, notably documents, each having an optical code, notably a barcode, which is neither connected nor coupled to any electronic chip that may be carried by the item, the optical codes appearing to encode the same information for the same optical reader of optical codes, but having different respective electromagnetic signatures, the electromagnetic signatures being unique to each of the items;
wherein the optical code has an electromagnetic signature and is not coupled or connected directly or indirectly to an electronic chip carried by the item, characterized in that the electronic chip includes at least one perturbing element which does not affect the information decoded by the optical reading of the optical code but which interacts electromagnetically with at least an electrically conductive portion of the optical code which contributes to the encoding of the optically read information, so as to provide the optical code with an electromagnetic signature connected to this perturbing element, the perturbing element preferably being an interruption of an electrically conductive portion of the optical code, an electrically conductive link, and/or an electrically conductive element dispersed in or on a backing of the optical code.

26. The item as claimed in claim 25, wherein the interruption takes a form of a slit with a width of less than 100 µm, the optical code preferably being a two-dimensional barcode.

27. The item as claimed in claim 25, wherein the perturbing element is an electrically conductive element dispersed in a polymeric or a fibrous substrate.

28. The item as claimed in claim 25, wherein the optical code includes at least one material whose shape varies with temperature in a reversible manner.

* * * * *